United States Patent [19]

Robertson et al.

[11] Patent Number: 6,054,054

[45] Date of Patent: Apr. 25, 2000

[54] CHEMICAL FOR THE PREVENTION OF ATTACHMENT OF MICROORGANISMS TO SURFACES

[75] Inventors: Linda R. Robertson, St. Charles; Michael R. St. John, Chicago, both of Ill.

[73] Assignee: Nalco Chemical Company, Naperville, Ill.

[21] Appl. No.: 08/413,657

[22] Filed: Mar. 30, 1995

Related U.S. Application Data

[63] Continuation-in-part of application No. 08/305,521, Sep. 6, 1994, abandoned.

[51] Int. Cl.[7] .................................................. C02F 1/50
[52] U.S. Cl. .................. 210/698; 162/161; 162/DIG. 4; 210/701; 210/764; 210/928
[58] Field of Search ................................ 210/698, 700, 210/701, 764, 928; 162/161, DIG. 4

[56] References Cited

U.S. PATENT DOCUMENTS

| | | | |
|---|---|---|---|
| 4,111,679 | 9/1978 | Shair et al. | 504/160 |
| 4,640,793 | 2/1987 | Persinski et al. | 210/701 |
| 4,936,987 | 6/1990 | Persinski et al. | 210/701 |
| 5,015,395 | 5/1991 | Muia et al. | 210/764 |
| 5,096,601 | 3/1992 | Muia et al. | 210/764 |
| 5,128,100 | 7/1992 | Hollis et al. | 210/698 |
| 5,246,547 | 9/1993 | Finck et al. | 162/DIG. 4 |
| 5,368,692 | 11/1994 | Derrick | 162/DIG. 4 |
| 5,393,380 | 2/1995 | Reed et al. | 162/DIG. 4 |

*Primary Examiner*—Peter A Hruskoci
*Attorney, Agent, or Firm*—Kelly L. Cummings; Thomas M. Breininger

[57] ABSTRACT

The inventors have discovered a new method of treating paper machine white water aqueous systems and surfaces in the paper machine white water aqueous systems that prevents or inhibits the adhesion of bacterial cells to the surfaces and thereby controls the biological fouling of the surfaces. The process comprises adding to the aqueous system an adhesion-inhibiting amount of vinyl cationic polymer. This method effectively inhibits the adhesion of the bacterial cells to exposed surfaces without killing the fouling organisms and also without harming non-target organisms. In addition, the method of the present invention advantageously does not cause the formation of harmful substances in the effluent from the systems treated.

6 Claims, 2 Drawing Sheets

CHEMICAL FOR THE PREVENTION OF ATTACHMENT OF MICROORGANISMS TO SURFACES

REFERENCE TO RELATED PATENT

The present application is a continuation-in-part of application Ser. No. 08/305,521 filed Sep. 6, 1994, by Linda R. Robertson and Michael R. St. John, entitled "Chemical for the Prevention of Microorganisms to Surfaces," now abandoned, the disclosure of which is incorporated herein by reference.

BACKGROUND OF THE INVENTION

1. Field of the Invention

This invention relates to a method for the prevention of the adhesion of bacterial cells to surfaces in paper machine white water aqueous systems by treating the water in contact with such surfaces with very low concentrations of vinyl cationic polymers. More particularly, it relates to a method for controlling the biological fouling of such surfaces by inhibiting the formation of a bacterial biofilm that is the common precursor to such fouling.

2. Description of the Prior Art

Biological fouling of surfaces is a serious economic problem in many commercial and industrial aqueous processes and water-handling systems. The fouling is caused by the buildup of microorganisms, extracellular substances, and dirt and debris that become trapped in the biomass. The organisms involved include bacteria, fungi, yeasts, algae, diatoms, protozoa, macroalgae, barnacles, and small mollusks like Asiatic clams. If not controlled, the biofouling caused by these organisms can interfere with process operations, lower the efficiency of processes, waste energy, and reduce product quality.

For example, cooling water systems used in power-generating plants, refineries, chemical plants, air-conditioning systems are commonly contaminated with airborne organisms entrained from cooling towers as well as waterborne organisms for the system's makeup water supply. The water in such systems is generally an excellent growth medium for these organisms, with aerobic and heliotropic organisms flourishing on the towers and other organisms colonizing and growing in such areas as the tower sump, pipelines, heat exchangers, etc. If not controlled, the biofouling resulting from such growth can plug the towers, block pipelines, and coat heat-transfer surfaces with layers of slime, and thereby prevent proper operation and reduce cooling efficiency.

Industrial processes subject to problems with biofouling include those used for the manufacture of pulp, paper, paperboard, and textiles, particularly water-laid nonwoven textiles. For example, paper machines handle very large volumes of water in recirculating systems called "white water systems." The furnish to a paper machine typically contains only about 0.5% of fibrous and nonfibrous papermaking solids, which means that for each ton of paper almost 200 tons of water pass through the headbox, most of it being recirculated in the white water system.

These water systems provide excellent growth media for microorganisms, which can result in the formation of microbial slime in headboxes, waterlines, and papermaking equipment. Such slime masses not only can interfere with water and stock flows, but when they break loose they can cause spots, holes, and bad odors in the paper as well as web breaks that cause costly disruptions in paper machine operations.

To control biological fouling, it has been common in the art to treat the affected water systems with certain chemical substances in concentrations sufficient to kill or greatly inhibit the growth of the causative organisms. For example, chlorine gas and hypochlorite solutions made with the gas have long been added to water systems to kill or inhibit the growth of bacteria, fungi, algae, and other troublesome organisms. However, chlorine compounds are not only damaging to materials of construction, they also react with organics to form undesirable substances in effluent streams, such as carcinogenic chloromethanes and chlorinated dioxins.

Certain organic compounds, such as methylenebis (thiocyanate), dithiocarbamates, haloorganics, and quaternary ammonium surfactants, have also been used. While many of these are quite efficient in killing microorganisms or inhibiting their growth, they also tend to be toxic or harmful to humans, animals, or other non-target organisms.

Scientific studies have shown that the first stage of biological fouling in aqueous systems is generally the formation of a thin bacterial film on the surface exposed to the water. The bacteria initiate the attachment and early colonization of the surface and modify it in a manner that favors the development of the more complex community of organism: that make up the advanced fouling of the surface. For example, P. E. Holmes (Appl. Environ. Microbiol. 52(6):1391–3, December 1986) found that bacterial growth on the submerged surfaces of vinyl swimming pool liners was a significant factor in the fouling of these surfaces by algae. When in association, the bacteria attached to the vinyl within 24 hours and the algae within 48 hours. In the absence of bacteria, however, one species of algae did not attach even after 7 days but in numbers an order of magnitude lower than those of the bacteria-contaminated counterpart. A general review of the mechanisms of biological fouling and the importance of the bacterial biofilm as the initial stage is given by C. A. Kent in "Biological Fouling: Basic Science and Models" (in Melo, L. F., Bott, T. R., Bernardo, C. A. (eds.), Fouling Science and Technology, NATO ASI Series, Series E, Applied Sciences: No. 145, Kluwer Acad. Publishers, Dordrecht, The Netherlands, 1988).

Based on these findings, one possible way to control the biological fouling of surfaces would be to prevent or inhibit the formation of the initial bacterial biofilm. This can be done, of course, by use of bactericidal substances, but they generally have the disadvantages mentioned above. It is therefore an object of the present invention to provide a method of controlling the biological fouling of surfaces that obviates the disadvantages of the prior art. Other objects and advantages of this invention will become apparent from a reading of the specifications and appended claims.

The scale control patent of L. J. Persinski, J. L. Walker, and P. Boffardi, U.S. Pat. No. 4,640,793 entitled "Synergistic Scale and Corrosion Inhibiting Admixtures Containing Carboxylic Acid/Sulfonic Acid Polymers", teaches that DADMAC can inhibit $CaCO_3$ scale formation and that this scale "harbors bacteria". However, it is well known that bacterial deposits do not require the presence of inorganic scales of any sort to form and generate deposit problems, although they may aggravate the situation. See for example Ch. 12, "Microbiology" in *Pulp and Paper, Chemistry and Chemical Technology* particularly pages 1386–1391 in which "factors affecting growth of microorganisms" are discussed and no reference is made to the necessity of scale. There is no possibility of forming $CaCO_3$ scale if no calcium is present. For example, if the medium used contains only glycerol, yeast extract, casamino acids, and glucose. Further, although CaCO₃ scale can be a common problem in the pulping and bleaching process, it is very uncommon on paper machines. Pulping and bleaching conditions are so severe that microbio logical growth can not be supported, and microbiological growth is not a problem in these processes. Of course in acid papermaking, CaCO₃ can not exist as it will readily dissolve under these conditions.

One solution that has been proposed to achieve these objects is the use of an ionene polymer to inhibit biofilm formation, as claimed in Canadian Patent 2,025,910 ('910 patent). The '910 patent specifically indicates that the structure of the polymer is critical for activity. Specifically, the '910 patent indicates the efficacy of the ionene polymers for purposes of biofilm inhibition are related to the structure of the polymer, rather then its molecular weight. The structure indicated in the '910 patent requires the presence of quaternized nitrogens located in the main polymeric chain or backbone of the polymer rather than in pendent groups.

As defined in the '910 patent, ionene polymers are cationic polymers in which a substantial proportion of the atoms providing the positive charge are quaternized nitrogens located in the main polymeric chain or backbone. Because the cationic nitrogen sites are in the main chain, ionene polymers are prepared through condensation polymerization. Cationic polymers having the cationic nitrogen sites on side chains off of the main polymer chain are referred to as pendant. The main chain in such a case is composed as carbons, and the polymers are prepared by addition (free radical) polymerization of vinyl monomers. Ionene polymers include epichlorohydrin/dimethyl amine, ethylene dichloride/ammonia and polyethylenimine. Examples of polymers of having nitrogen sites on side chains include diallyldimethylammonium chloride and dimethylaminoethylacrylate-methylchloride quat.

SUMMARY OF THE INVENTION

A new method of treating paper machine white water aqueous systems and surfaces in the paper machine white water aqueous systems that prevents or inhibits the adhesion of bacterial cells to the surfaces and thereby controls the biological fouling of the surfaces is disclosed. The process comprises adding to the aqueous system an adhesion-inhibiting amount of vinyl cationic polymer. This method effectively inhibits the adhesion of the bacterial cells to exposed surfaces without killing the fouling organisms and also without harming non-target organisms. In addition, the method of the present invention advantageously does not cause the formation of harmful substances in the effluent from the systems treated.

DESCRIPTION OF THE PREFERRED EMBODIMENTS

Figure 1:
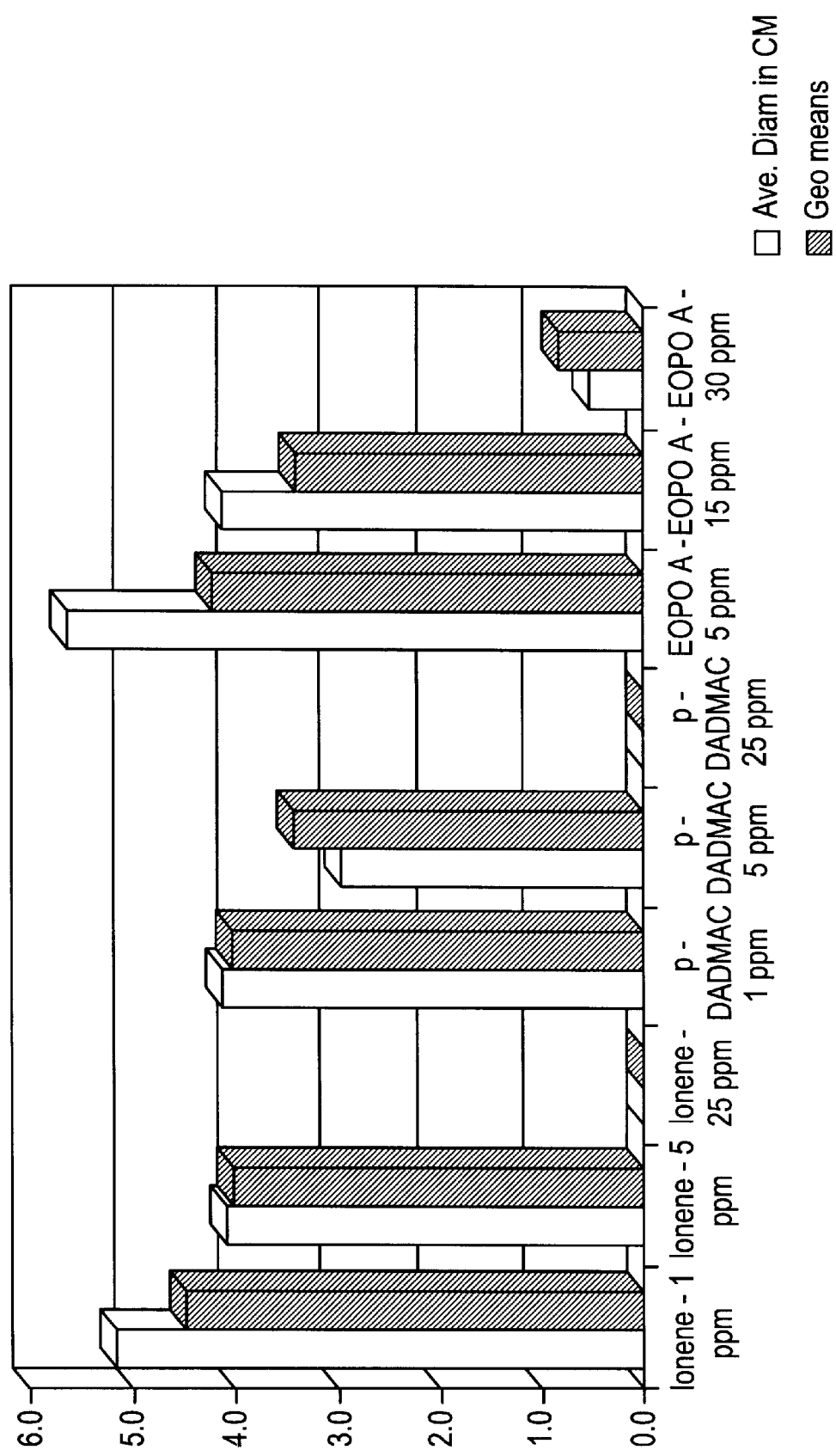
FIG. 1 is a graph comparing the efficacy of an EOPO polymer, ionene and poly-DADMAC.
Figure 2:
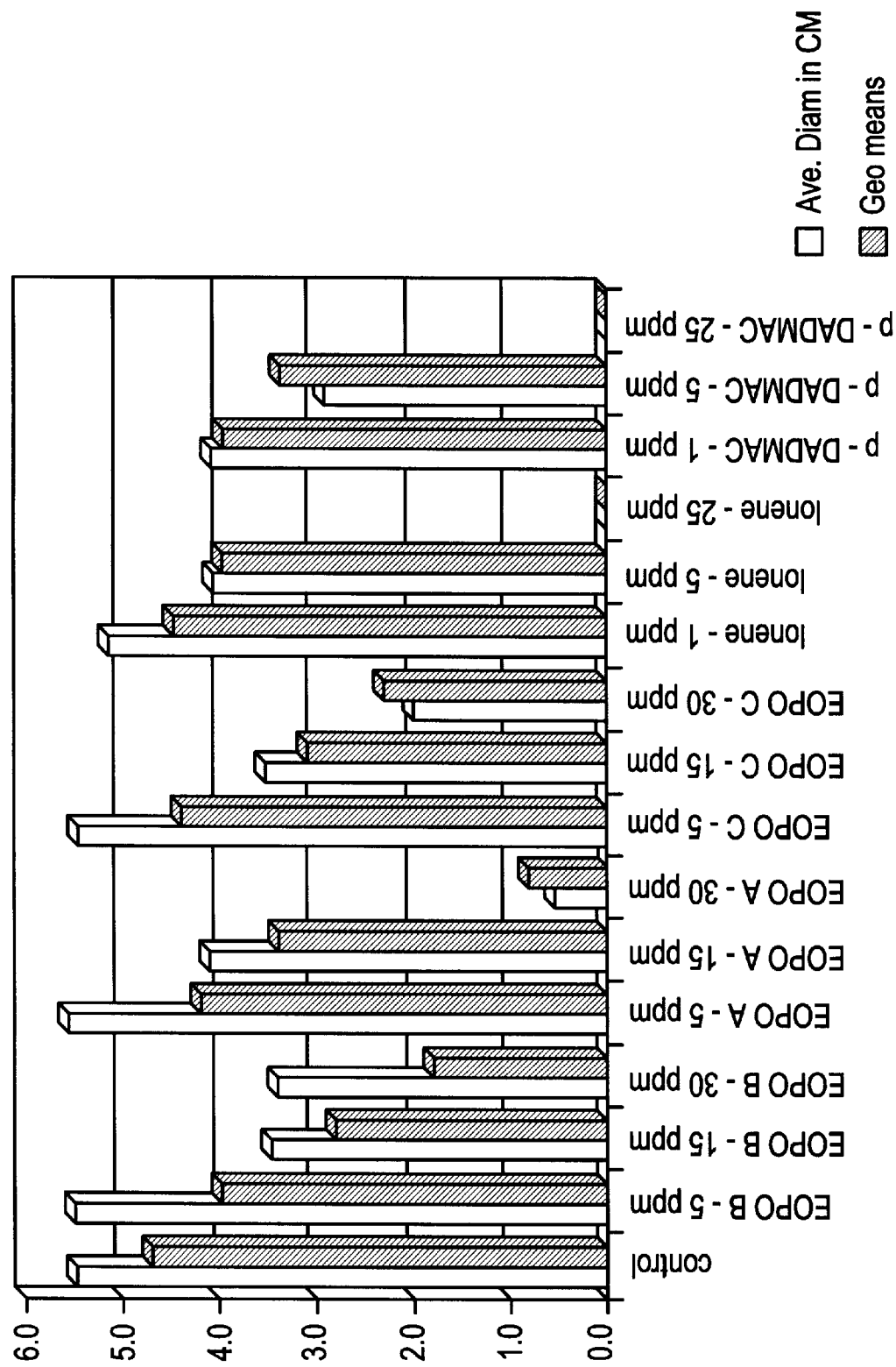
FIG. 2 is a graph comparing the efficacy of several EOPO polymers, ionene and poly-DADMAC.

The claimed invention comprises a process for inhibiting the adhesion of bacterial cells to solid surfaces and controlling biological fouling in paper machine white water aqueous systems. Preferably, the paper machine aqueous system is selected from the group consisting of fresh water, white water, broke pulp and stock chest water. The process comprises adding to the aqueous system an adhesion-inhibiting amount of vinyl cationic polymer in an amount ranging from about 0.01 to about 5000 parts per million (ppm), more preferably from about 1.0 to about 1000 ppm and most preferably from about 2.0 to 60 ppm based on the weight of the aqueous liquid in the system. The vinyl cationic polymer is preferably selected from the group consisting of p-DADMAC=poly(diallyldimethylammonium chloride), p-DMAEA*MCQ=poly(dimethylaminoethylacrylate methylchloride quat), p-DMAEM*MCQ=poly (dimethylaminoethylmethacrylate methylchloride quat), p-APTAC=poly(acrylamido-N-propyltrimethylammonium chloride) and p-MAPTAC= poly(methacrylamido-N-propyltrimethylammonium chloride). Most preferably, the vinyl cationic polymer is p-DADMAC.

The vinyl cationic polymers used in the claimed invention are prepared by free radical polymerization, either as a solution or as an inverse emulsion. Preferably, the polymers used in the claimed invention are prepared using a solution free radical polymerization process because this provides easier handling of the polymers at a lower cost of production. In those cases where the intrinsic viscosity of the cationic vinyl polymer is in excess of 3–4 dl/g, an inverse emulsion free radical polymerization is preferred in order to achieve pumpable products with acceptable polymer concentrations. The free radical polymerizations discussed above are detailed in the Textbook of Polymer Science, 3rd Ed. by F. W. Billmeyer, Jr.; John Wiley & Sons, 1984, the disclosure of which is incorporated herein.

Preferably, the vinyl cationic polymer of the claimed invention has an intrinsic viscosity of from about 0.01 to about 10 dl/g. More preferably, the vinyl cationic polymer has an intrinsic viscosity of from about 0.01 to 2.0 dl/g. Most preferably, the vinyl cationic polymer has an intrinsic viscosity of from about 0.4 to 1.2 dl/g.

Several addition points may be used in conjunction with the method of the invention. The polymer preferably is fed to the incoming white water to minimize microbial deposits around fresh water showers that are located around the paper felts, head box and saveall portions of the paper machine. Alternatively, the polymer may be added to the white water silo to minimize wet end deposits caused by adhesion of microorganisms to surfaces. In yet another alternative embodiment, the polymer may be added to the tray water to minimize wet end microbial slime deposits.

The following examples are presented to describe preferred embodiments and utilities of the invention and are not meant to limit the invention unless otherwise stated in the claims appended hereto.

EXAMPLE 1

A bacterium was grown in a modified nutrient medium designed to promote biofilm formation. Eight-ounce flush jars were rinsed once in acetone and three times in deionized water to remove any surface contaminants, drained and autoclaved. The selected chemical treatment was added to each of the jars after filter sterilization and the alcohol carrier was allowed to evaporate in a stream of sterile air for the EOPO samples only. An alcohol carrier was not needed for the ionene or DADMAC samples. 50 ml of sterile nutrient medium was added to each jar. After inoculation with a frozen culture of the bacterium the jars were placed into a new Brunswick Series 25 orbital shaker at 35° C. at 210 rpm. At predetermined intervals, biofilms were rated for diameter and vigor and the average of the geometric means of diameter and vigor were reported. The attached graphs show the average diameters for each treatment in addition to the average of the geometric means. The smaller the diameter and/or the geometric mean, the more effective the treatment.

Chemicals tested included a copolymer of polyethylene oxide and polypropylene oxide (EOPO). A 1% concentration was used for the EOPO co-polymer stock solutions in ethanol due to the limited solubility of the product. The EOPO solution was filter sterilized through a 0.45 μm filter and added directly to the jars in pre-determined volumes. The ethanol was allowed to evaporate before addition of the broth medium. The ionenes and DADMACs were diluted to 1% in water and predetermined volumes were filter sterilized through a 0.45 μm filter. Broth medium was then added to each jar and all were inoculated with the biofilm-forming bacteria.

Changes can be made in the composition, operation and arrangement of the method of the present invention described herein without departing from the concept and scope of the invention as defined in the following claims:

What is claimed is:

1. A process for inhibiting the adhesion of bacterial cells to solids surfaces and controlling biological fouling in a paper machine aqueous system which comprises adding to the aqueous system from about 0.01 to about 45 parts per million, based on the weight of the aqueous liquid in the system of a vinyl cationic polymer selected from the group consisting of poly(diallyldimethylammonium chloride), poly(dimethylaminoethylacrylate methylchloride quat), poly(dimethylaminoethylmethacrylate methylchloride quat), poly(acrylamido-N-propyltrimethylammonium chloride) and poly(methacrylamido-N-propyltrimethylammonium chloride).

2. The process of claim 1, wherein the vinyl cationic polymer has an intrinsic viscosity of from about 0.01 to about 10 dl/g.

3. The process of claim 2, wherein the vinyl cationic polymer has an intrinsic viscosity of from about 0.01 to 2.0 dl/g.

4. The process of claim 3, wherein the vinyl cationic polymer has an intrinsic viscosity of from about 0.4 to 1.2 dl/g.

5. The method of claim 1, wherein the vinyl cationic polymer is added at an addition point selected from incoming water, white water silo and tray water.

6. The method of claim 1, wherein the paper machine aqueous system is selected from the group consisting of fresh water, white water, broke pulp and stock chest water.

* * * * *